June 16, 1959

A. J. SIMMONS ET AL 2,890,899

MULTIPLE DUCT SLEEVE

Filed Oct. 31, 1955

INVENTORS
ALDRED J. SIMMONS
ANTHONY J. BARTA

BY

Andrus & Sceales

Attorneys

June 16, 1959　　A. J. SIMMONS ET AL　　2,890,899
MULTIPLE DUCT SLEEVE
Filed Oct. 31, 1955　　2 Sheets—Sheet 2
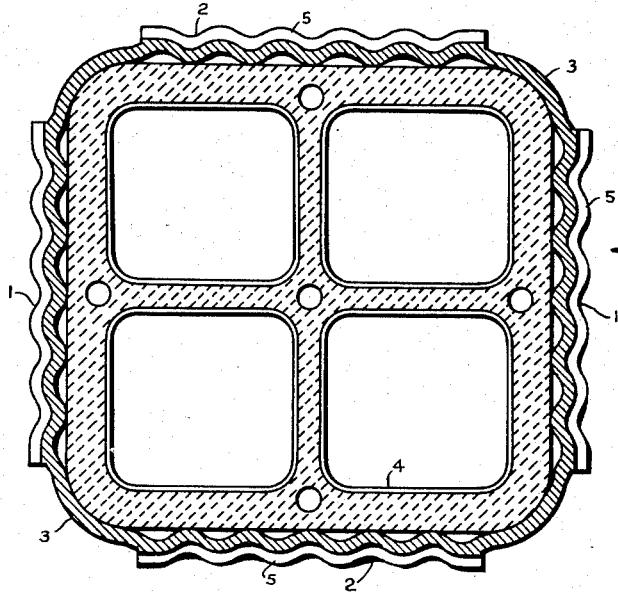
Fig. 3
Fig. 4
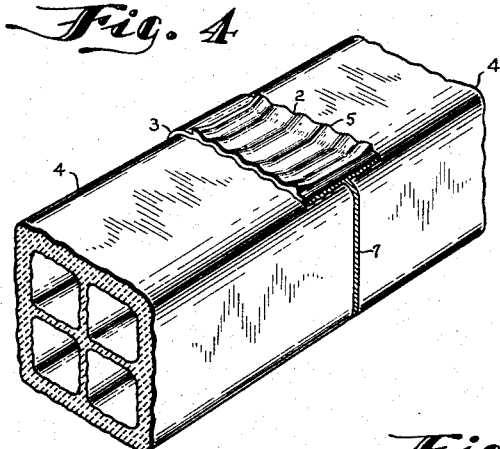
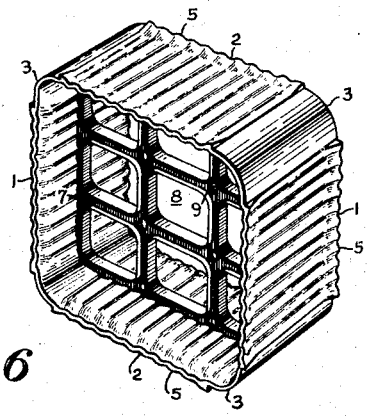
Fig. 6
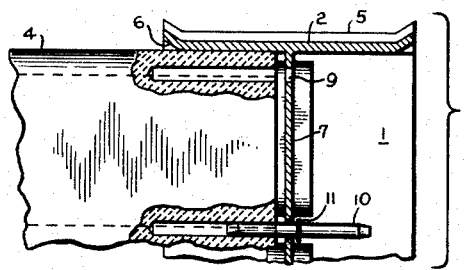
Fig. 5
INVENTORS
ALDRED J. SIMMONS
ANTHONY J. BARTA
BY
Attorneys

2,890,899

MULTIPLE DUCT SLEEVE

Aldred J. Simmons, Sheboygan, and Anthony J. Barta, Glenbeulah, Wis., assignors to Plymouth Industrial Products, Inc., Plymouth, Wis., a corporation of Wisconsin Application October 31, 1955, Serial No. 543,911

1 Claim. (Cl. 285—18)

This invention relates to a multiple duct sleeve, and more particularly to a molded semi-flexible sleeve for use in joining the ends of integrally formed multiple duct tile.

Multiple duct tile has many uses in industry, particularly in the utility field where it is used extensively to contain telephone, electric and other cables underground. The tile is manufactured in short sections and is laid piece by piece with connecting joints in a trench or ditch for subsequent installation of underground cable.

The joint between tile sections has been conventionally wrapped with what is known as a mortar bandage in an attempt to seal the joint and prevent leakage of water and silt into the duct. This bandage was made by laying a double layer of cheese cloth on a flat table, troweling a layer of mortar cement on the cloth, laying a second cloth over the cement, and then rolling up the ends of the bandage to facilitate handling. The bandage was then wrapped around the tile joint and allowed to harden. Cords have often been tied around the bandage as a further protective measure.

The use of mortar bandages has produced many problems, particularly as to labor costs and speed of tile laying. It has been found difficult to apply the bandage in any way other than by hand. Since mortar hardens quickly, fresh mortar has to be continuously made in the field and kept ready for the laying of each new tile. In addition, wrapping a mortar bandage around a pipe in a narrow trench was difficult at best. Thus, the labor costs in laying tile have been high.

In order to lay the cable in the duct, a process known as rodding has been used. This was previously done by manually pushing rods through the conduit from manhole to manhole. The rods were screwed or otherwise assembled together as each was placed in the conduit, forming one long piece. The long rod was then used to pull a steel wire through, which in turn was used to pull in a wire rope winch line which finally was used to pull the cable through. This procedure was unnecessarily complicated and time consuming.

The present invention replaces the awkward mortar bandage with a flexible sleeve of unitary construction which effectively seals the joint between multiple duct or other similar type conduits and also seals each individual duct from the others in multiple duct tile lines. Leakage of air, water or silt through the joint is reduced to a minimum, thereby protecting the contents of the duct. The sleeve may be easily applied in close quarters with no need for costly wrapping procedures, and is adaptable to machine instead of hand laying.

The old method of rodding is eliminated, the excellent seal allowing for pneumatic rodding. In this method, a projectile to which a steel wire is attached is forced at high speed through the conduit by means of air pressure. The wire thus laid in the duct serves as a means for pulling heavy cable into the duct. Time consuming hand rodding is thereby eliminated, and the cost is reduced.

The accompanying drawings illustrate the best mode presently contemplated for carrying out the invention.

In the drawings:

Fig. 3 is a transverse section taken on line 3—3 of Fig. 2;

Fig. 4 is a perspective view of the complete joint and with parts broken away;

Fig. 5 is a broken transverse section showing a sleeve applied to a tile and with a dowel pin passing therethrough for alignment, and Fig. 6 is a perspective view of another embodiment of the invention.

Figure 1:
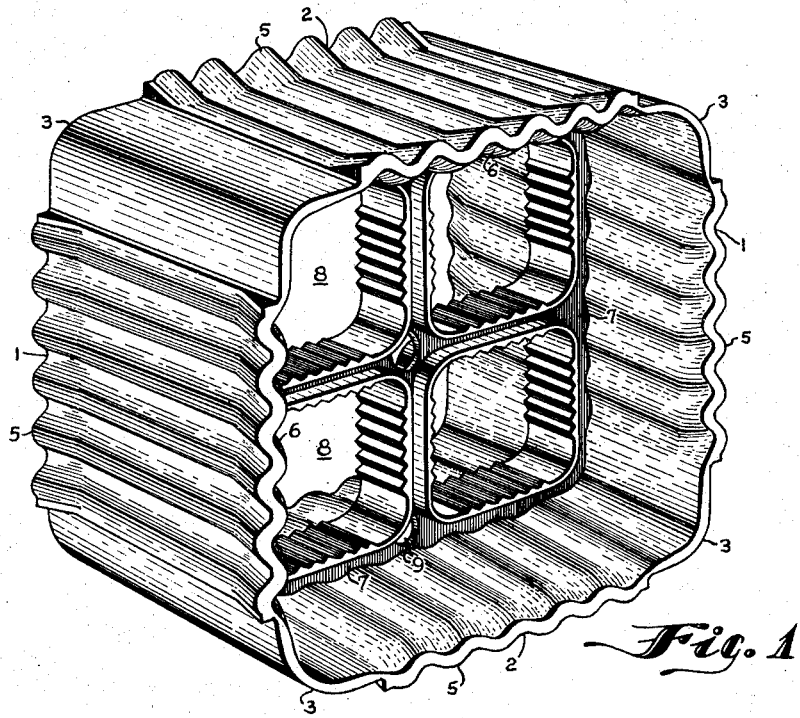
Figure 1 is a perspective view of a multiple duct sleeve constructed in accordance with the invention.

As shown in the drawings, the sleeve generally comprises a pair of longitudinally extending spaced vertical side wall portions 1 joined together along their upper and lower edges by a pair of horizontal wall portions 2 to form a rectangular tube-like member. The corners 3 between walls 1 and 2 are curved to accommodate ducts 4 having rounded corners.

The portion of each wall 1 and 2 between corners 3 is formed with longitudinally extending accordion-pleats or corrugations 5 which allow for easy fitting of the sleeve, as will be described. In addition, the outer end portion of the sleeve walls are taperel outwardly or flared at 6, for easy entry of the tile therein.

An integral flange-like web 7 is disposed intermediate the ends of walls 1 and 2 and extends across the sleeve to divide the latter into duct receiving portions corresponding with the ducts of the tile. Web 7 is provided with a plurality of longitudinally flanged openings 8 for the passage of conduits therethrough, and also serves to reinforce the sleeve. The flanges of openings 8 are continuous and are adapted to interlock with the tile inside the corresponding ducts of the latter.

Figure 2:
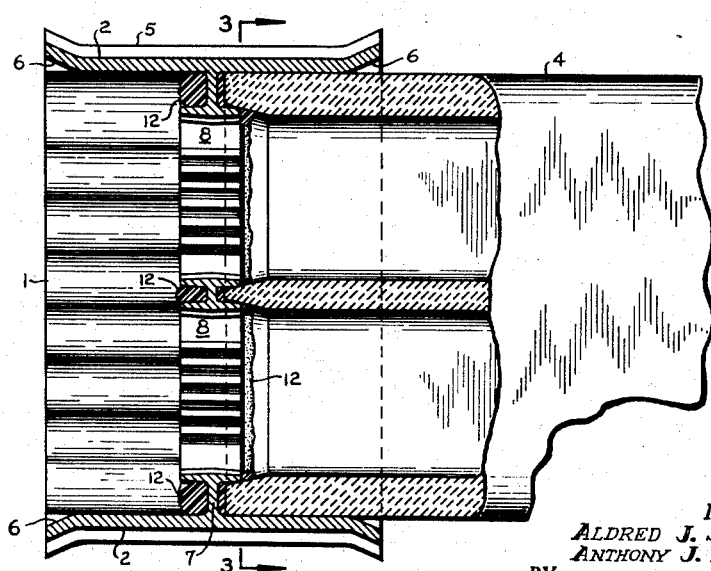
Fig. 2 is a longitudinal section of the sleeve showing the sleeve applied to a duct.

The sleeve shown in Figs. 1 and 2 is of flexible molded construction and comprises a suitable rubbery thermoplastic material or the like. This type of composition has been found to be very suitable for underground installation, in view of its high resistivity to the corrosive influence of water, soil, temperature changes and the like. A sleeve made of this material is flexible and shape restorative.

The tile 4 is made of baked clay or other suitable material, and has a cross section essentially similar to that of the sleeve.

Formation of a joint between tile ends is accomplished in the following manner. A sleeve is pushed over the end of a tile and fitted so that the end surfaces of the tile butt against web 7 between openings 8 and walls 1 and 2 to form an overlapping or groove and tongue connection. A second tile end is then similarly fitted within the sleeve on the opposite side of web 7. Web 7 provides a peripheral seat for the end edges of each tile duct. The flanges of openings 8 cooperate with each other and with walls 1 and 2 to provide a continuous peripheral groove for receiving the end edge of each duct of the tile. Fluted portions 6 and rounded corners 3 allow for easy initial entry of the tile into the sleeve.

The inner ribs or corrugations 5 fit tightly around and grip the wall of the tile and will expand to accommodate variations in tile sizes, the amount of expansion and flattening out of the corrugations being a function of sleeve size in relation to tile size. The rounded sleeve corners coact with corrugations 5 as the tile is inserted into the sleeve, acting as expandable hinge joints which have a radius less than the tile and extend more than 90° to keep a tight fit over various sizes of tile.

To insure alignment of the multiple duct tile sections, holes are provided in the tile ends. Similar holes 9 are formed in web 7 so that a suitable dowel pin 10 may be inserted horizontally through an aligned set of holes. Holes 9 may be disposed centrally of web 7 and at the four corners thereof. However, it has been found that one dowel pin 10 at the center is sufficient for four-way duct tile, while for other sizes more dowels may be used.

Each pin 10 has a stop member 11 secured thereto at the center. Member 11 is shown as a washer which is larger than the dowel pin hole of the tile so that the dowel pin 10 will not get lost in the hole. Pins 10 are inserted into the hole after fitting the sleeve to the first duct.

In some instances, especially where pneumatic rodding is to be used, it may be desirable to provide an extra strong seal so that each conduit opening is firmly sealed from every other conduit opening and from the outside. This is accomplished by applying a mastic material 12 to the surface of web 7 prior to forming the joint. The tile end is embedded in the mastic in the completed joint.

Mastic 12 is of a non-setting material and this may be applied to the sleeve at the time of manufacture. The mastic composition may contain as its major non-setting tacky ingredient, a high viscosity polybutene blended with polyethylene. Such mastic compound does not react with the sleeve or tile material; nor does it react with plastic sheathing on, for example, multiple-wire cable, and thus is preferred for use in the sleeve.

If currugations are not desirable, the sleeve may be made of a substance having enough stretch in it to compensate for tile size variations. Such a composition might be a rubber or other similar compound.

The sleeve disclosed herein may be utilized to sealably join 2, 4, 6, 8, 9 or other multiple conduit tile. Fig. 6 shows a sleeve made to join tile having nine conduit openings therein. The same numerals apply to Fig. 6 as are applied to Figs. 1 to 5.

In some instances, ducts 4 may be of circular or other non-rectangular shape, and the sleeve must be shaped accordingly.

The invention provides a novel sleeve for joining multiple duct tile sections easily and quickly in the field. The mortar bandage formerly used is eliminated, thereby reducing labor costs substantially. The trench size will be reduced and digging, filling and repaving costs will be lessened.

The joint formed is tight, permitting pneumatic instead of hand rodding. In addition, the joint will not allow the duct to silt up, leaving the duct clear for admission of future cable, and preventing corrosion of cable wires.

Various embodiments of the invention may be employed within the scope of the following claim which particulraly point out and distinctly claim the subject matter regarded as the invention.

We claim:

A sleeve for joining multiple duct tile and sealing the end edges thereof to maintain the ducts separate from one another and from the outside, comprising a tubular wall member having a shape corresponding to that of the tile and adapted to receive the end of a tile in each end of the member with the wall of the member gripping the tile on the outside, a central web disposed intermediate the ends of the member and extending across the latter to divide the same into duct receiving portions corresponding with the ducts of the tile, said web providing a peripheral seat for the end edges of each duct of the tile and having flanged openings with continuous flanges adapted to interlock with the tile inside the corresponding ducts of the latter, said member and web being molded integrally of shape-restorative material, and the flanges at said flanged openings cooperating with each other and with said wall member to provide a continuous peripheral groove for receiving the end edge of each duct of the tile and adapted to contain mastic sealing material receiving and embedding the end edges of the tile to seal the same with the sleeve, and the outer wall of the sleeve member being corrugated longitudinally for substantially its full length to provide for maximum expansion thereof near the opposite ends of the member to accommodate the entry of tile of maximum size within the dimensional tolerance limits of tile construction and to provide for a flattening of the internal ridges of the corrugations and relocation of the valleys therebetween as the tile is driven to a position of engagement with the central web of the sleeve whereby tile of dimensions within predetermined tolerance limits may be tightly gripped and joined by the sleeve.

References Cited in the file of this patent
UNITED STATES PATENTS

| | | |
|---|---|---|
| 259,048 | Richardson | June 6, 1882 |
| 279,086 | Emery | June 5, 1883 |
| 616,895 | Carroll | Jan. 3, 1889 |
| 660,308 | Pixley | Oct. 23, 1900 |
| 1,064,442 | Cadigan | June 10, 1913 |
| 1,085,481 | Prasch | Jan. 27, 1914 |
| 1,661,674 | Osborn | Mar. 6, 1928 |
| 2,261,991 | Gerster | Nov. 11, 1941 |
| 2,470,359 | McLean | May 17, 1949 |
| 2,624,308 | Wittlin | Jan. 6, 1953 |
| 2,799,533 | Bachli et al. | July 16, 1957 |

FOREIGN PATENTS

| | | |
|---|---|---|
| 465,115 | Great Britain | Apr. 30, 1937 |
| 738,051 | Great Britain | Oct. 5, 1955 |